United States Patent [19]

Marcus et al.

[11] Patent Number: 4,734,862

[45] Date of Patent: Mar. 29, 1988

[54] CONFLICT MONITOR

[76] Inventors: Edward Marcus, P.O. Box 5342, Baltimore, Md. 21209; Franklyn M. Rybak, 11648 Manor Rd., Glen Arm, Md. 21057

[21] Appl. No.: 733,842

[22] Filed: May 14, 1985

[51] Int. Cl.[4] ........................ B60Q 9/00; G06F 15/48

[52] U.S. Cl. .................................... 364/436; 340/931; 340/642

[58] Field of Search ............... 364/436, 186, 900, 550, 364/551, 483, 200; 340/906, 909, 910–915, 931, 642; 315/129, 132

[56] References Cited

U.S. PATENT DOCUMENTS

| | | | |
|---|---|---|---|
| 3,328,791 | 6/1967 | Casciato | 340/912 |
| 3,902,156 | 8/1975 | Hill | 340/931 |
| 3,922,643 | 11/1975 | Poole | 364/900 |
| 4,077,061 | 2/1978 | Johnston et al. | 364/483 |
| 4,135,145 | 1/1979 | Eberle | 340/931 |
| 4,276,605 | 6/1981 | Okamoto et al. | 364/483 |
| 4,383,240 | 5/1983 | Staats, Jr. | 340/915 |
| 4,586,041 | 4/1986 | Carlson | 340/931 |

OTHER PUBLICATIONS

"Conflict Monitors", 1983, NEMA Standard, 5-1-5-1978, Section 6, pp. 45–56.

*Primary Examiner*—Gary Chin

*Assistant Examiner*—Thomas G. Black

*Attorney, Agent, or Firm*—Berman, Aisenberg & Platt

[57] ABSTRACT

An apparatus and method are disclosed which find particular utility as a component of a traffic control system known as a conflict monitor. The apparatus includes a number of solid state switches which are activated to scan inputs from traffic control signals. The inputs are sequentially applied to a A-D converter which samples the voltage and applies it to a microprocessor which is programmed to determine the voltage and analyze the signals for conflicts, or other errors. The input lines are also connected to terminals of a program board whereby the microprocessor can instruct a switch to ground the common pin on the program board to allow program board inputs to be applied to the microprocessor for indicating permissible conflicts. A method includes a technique for determining the voltage of an input analog signal by scanning a plurality of input signals and sampling them in accordance with a relationship which provides minimum error. A display may be operated in one of two modes. In the first mode, a display indicates the signals involved in a conflict, or other error determination. In a second mode, the display may be sequentially stepped through each signal to determine its particular state at the time of a conflict.

18 Claims, 5 Drawing Figures

STATUS TABLE

| | W | G | Y | R | SH G | SH X | CH FL | CO NF. |
|---|---|---|---|---|---|---|---|---|
| CHANNEL 1 | | | | | | | | |
| CHANNEL 2 | | | | | | | | |
| CHANNEL 3 | | | | | | | | |
| CHANNEL 4 | | | | | | | | |
| CHANNEL 5 | | | | | | | | |
| CHANNEL 6 | | | | | | | | |
| CHANNEL 7 | | | | | | | | |
| CHANNEL 8 | | | | | | | | |
| CHANNEL 9 | | | | | | | | |
| CHANNEL 10 | | | | | | | | |
| CHANNEL 11 | | | | | | | | |
| CHANNEL 12 | | | | | | | | |

CONFLICT MONITOR

TECHNICAL FIELD

This invention relates to methods and apparatus for measuring a plurality of voltage signals and comparing these signals to each other in accordance with predetermined logic. The invention finds particular utility in a traffic control system component known as a conflict monitor which determines whether a traffic control system is providing conflicting, or dangerous, signals.

BACKGROUND ART

A conflict monitor is an electronic apparatus which is connected to a traffic controller. A traffic controller is a familiar apparatus which controls traffic lights at an intersection. The typical traffic controller comprises a plurality of electronic or electromechanical switches each of which is operated by a timing mechanism, such as a clock. The clock is pre-programmed so that it activates, for example, a green light in one direction for a predetermined period of time, then activates the yellow light in that direction, and then the red light. When the controller activates a green light in one direction, it also activates red lights in intersecting, or conflicting directions. The conflict monitor receives input signals indicating which lights have been activated and performs various logic operations on these signals. The definition of a "conflict" can vary, but is at a minimum defined as green signal indications being provided to intersecting lanes of traffic. In addition, a conflict monitor may measure the duration of the green, yellow or red lights and indicate a fault if these durations meet or exceed predetermined time periods. The "walk" and "don't walk" signals may be considered in a manner similar to that of the colored traffic signals so that a "conflict" may include such errors as providing a "walk" signal across a lane of traffic receiving a green light.

When the conflict monitor determines the existence of an error, it typically activates a relay which causes all lights in the intersection to be flashing red or flashing yellow.

Various conflict monitors are known in the prior art. U.S. Pat. No. 3,629,802 (Clark, et al.) shows a conflict monitor employing a number of logic elements interconnected to produce an output when conflicting right-of-way command signals are coincident. U.S. Pat. No. 3,778,762 (Jarko, et al.) uses a plurality of logic elements to detect conflicts between traffic signals. This monitor uses optically-coupled sensors, with the output of each sensor being directed to at least one logic element. U.S. Pat. No. 3,902,156 (Hill) teaches a conflict monitor wherein each input is connected to an AC-to-DC converter, and the input of this converter is applied to individual logic elements which are interconnected to detect various conflicts. U.S. Pat. No. 4,135,145 (Eberle) teaches a conflict monitor wherein the outputs of traffic control switches are inputs to fault detectors which comprise a plurality of logic elements arranged to effect a predetermined logical operation.

U.S. Pat. No. 4,383,240 (Staats, Jr.) teaches a device for storing and visually displaying the operational state of a traffic control system. This allows the status of any input to be indicated as of the time of the occurrence of an error.

It is also known to measure voltage of a signal by taking time-spaced samples. U.S. Pat. No. 4,077,061 (Johnston, et al.) shows a circuit for measuring electrical energy wherein voltage and current are randomly sampled and converted to respective binary representations. These binary representations are then processed to produce a visual display of the electrical energy. U.S. Pat. No. 3,984,737 (Okamura, et al.) also teaches measurement of instantaneous voltage and current and uses a computer to determine the product of these values. Values determined at previous times are added to the present value to eliminate unnecessary frequency components. U.S. Pat. No. 4,240,149 (Fletcher, et al.) shows a circuit for measuring a parameter which is an integral with respect to time. A variable is sampled at a frequency asynchronous with that of the variable, and the sampled values are periodically summed to provide an indication of the interval.

Multiplex devices for use in digital circuits are also known, such as that shown in U.S. Pat. No. 4,307,392 (Loshbough, et al.). This patent shows a scanning circuit for causing signals in storage registers to be transmitted to a pre-programmed ROM.

SUMMARY OF THE INVENTION

Applicant's invention relates to a method and apparatus primarily used in the art of traffic control systems to determine whether a conflict exists between various combinations of signal indications at an intersection. Apparatus is provided for receiving a plurality of inputs and for sequentially scanning these inputs to produce a series of input signals. The input signals are directed to an analog-to-digital converter, and the digitized signal is applied to a microprocessor. A microprocessor is programmed to detect various combinations of input signals which would represent a conflict, to detect other system faults, and to produce an output indicative thereof.

The input channels, which carry signals representative of the voltage applied to a signal indication light are sampled in a unique manner. The channels are scanned at a rate of 4,096 Hz, which means that each channel is observed for an interval of 244 microseconds. Within this interval, the analog-to-digital converter samples the voltage during an approximately 15 microsecond period, and this period begins about 50 microseconds after the beginning of the channel sample interval. This allows any ringing to dissipate to permit accurate sampling. Samples are taken from each channel at a frequency of about 85 Hz (preferably 85.333 Hz), which is asynchronous with the 60 Hz input signal. The samples are accepted by the microprocessor and applied to a look-up table, the corresponding numbers of the look-up table being summed to provide a representation of the voltage of the input wave. The processor receives a digital word from the analog-to-digital converter and this digital word is used as the address in the look-up table. The table is a representation of what would graphically be substantially a parabola, whereby squared output values correspond to input values.

Use of 17 samples per sample period has been shown to minimize error. Further, sampling at a rate which is asynchronous with the 60 Hz input signal, avoids sampling at a synchronous error point.

The scanning of inputs is accomplished by the use of two multiplexing units as will be more fully described below.

The input signal is modified to have an amplitude varying between 0 and +10 volts for conversion by the analog-to-digital converter. Thus, the line input voltage is first attenuated to be ten volts peak-to-peak and is then raised by a bias network to have only positive voltages. The technique for measuring the amplitude of the input voltage is extremely accurate and provides an indication of the voltage within the time period required for conflict indication by the National Electrical Manufacturers Association (NEMA). It is required that a conflict be reported within 0.200 to 0.475 seconds, and Applicant's technique provides two indications of the input amplitude within this interval.

The invention also provides for reading a program board, which is an article prescribed by NEMA. A program board, as will be more fully described below, provides an indication of permissible conflicts by providing a ground voltage at a pin on the program board representative of that combination of input signals. According to the invention, the program board pins are also connected to the input lines receiving signals from the traffic signals. Ordinarily, the program board inputs are floating, and when the processor directs the common pin on the program board to be pulled to a ground voltage, the program board inputs connected to the common terminal will also be grounded. Otherwise, the program board pin will have a voltage other than ground. The multiplexing arrangement previously described then scans each of the program board pins and these inputs are received by the processor. This then allows the processor to be reprogrammed for various combinations of permissible conflicts as represented by the program board. Preferably, the processor is reprogrammed every time the monitor is turned on, and it may be reprogrammed at other desired times.

Another feature of the invention is that the processor includes a status memory which records the status of each channel for each scan of the input signals. Then, when a conflict is detected, the display will be capable of showing the status of each channel at the time of conflict, in addition to the channels which were involved in the conflict. This feature provides assistance to maintenance personnel because they can more accurately determine the source of error.

BRIEF DESCRIPTION OF THE DRAWINGS

With reference to FIG. 1, there is shown a block diagram of a circuit in accordance with the invention. A microprocessor 2 basically controls operation of the apparatus in accorance with a process, the steps of which will be described below with respect to the preferred embodiment of FIG. 2. A plurality of input and sampling circuits, collectively identified as 4, receives inputs from the traffic signals and the program board, and these signals are conducted to the microprocessor 2 by a bus 6. Control signals from the microprocessor are also transmitted to the input and sampling circuits by the bus 6. Peripheral circuitry 8 provides circuits for isolation, resetting and monitoring, which functions are known in the art. A maintenance switch 10 operates through the peripheral circuitry to cause the processor to display the status of each channel at the time of the conflict as will be more fully described below. Power supply 12 provides power to the circuitry. Display 14 preferably comprises a plurality of light-emitting diodes (LED) for indicating status of the input signals at the time of a conflict or other error. Output relay 16 is activated by the microprocessor and causes the lights at an intersection to flash when a conflict is detected.

FIGS. 2*a* and 2*b* are a circuit diagram of a preferred embodiment of the invention. The input circuitry includes a purality of multiplexing semiconductor switches. A first switch 18 is illustrated to show input signals from both traffic indicators and a program board. It should be understood that in the preferred embodiment there are six such switches (illustrated by dots 18′) even though there can be more or fewer than six. Switches 20 and 22 are used, in the preferred embodiment, only for accepting inputs from the program board. It will be appreciated that additional signal indication inputs could be provided if desired.

Figure 1:
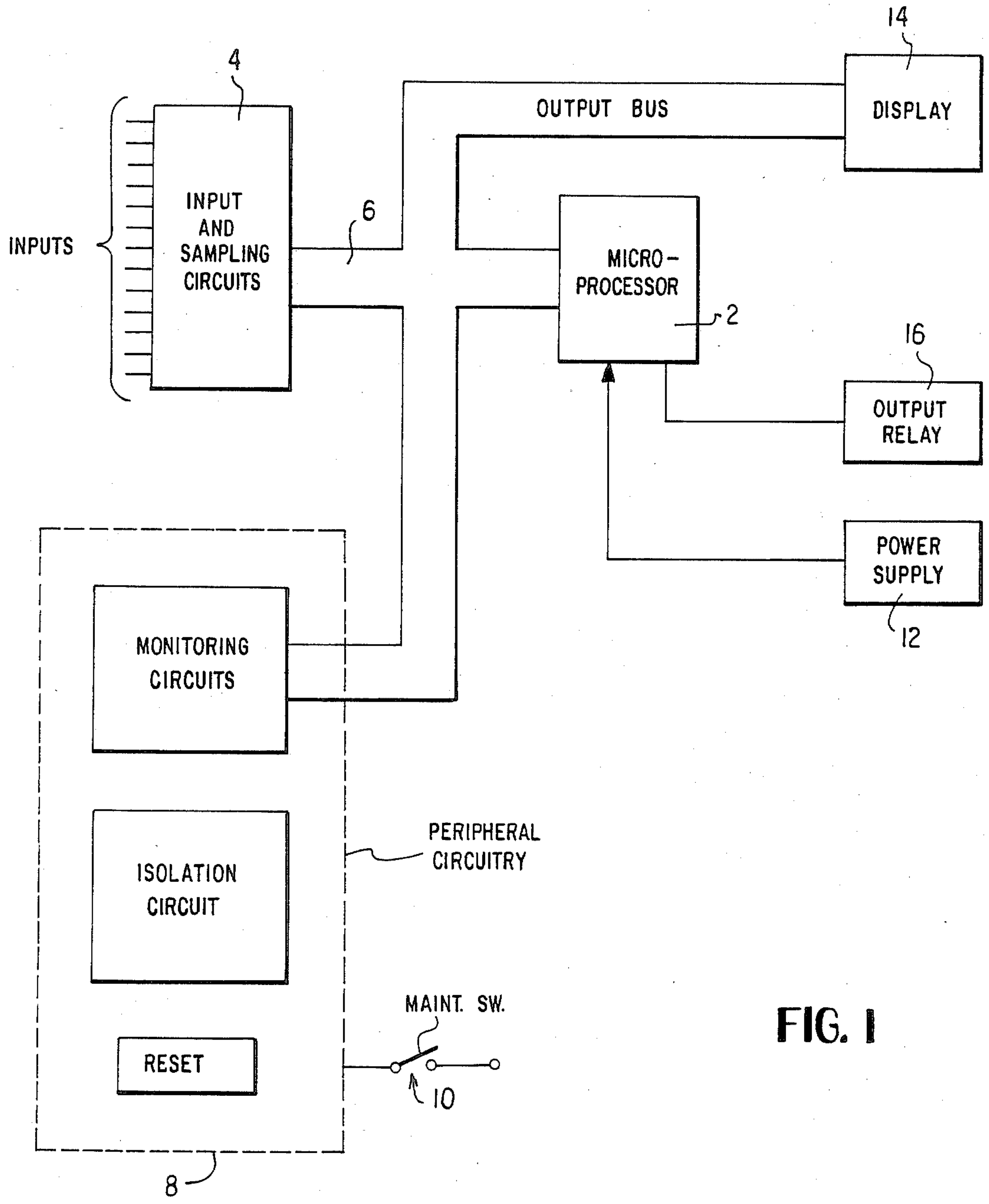
FIG. 1 is a block diagram of an apparatus in accordance with the invention.

Each of these switches 18, 20, 22 is controlled by address signals produced by the microprocessor 2. Address instructions to switch 18 are input through bus 24, and address information is carried to switches 20 and 22 by busses 26 and 28, respectively. Switch 18 has a set 30 of input terminals, and one such terminal 32 is specifically illustrated. Switch 20 has a set 34 of input terminals, and one such terminal 36 is specifically illustrated. Switch 22 has a set 38 of input terminals.

Switch 18 has an output line 40, switch 20 has output line 42, and switch 22 has output line 44. Each of the output lines 40, 42, and 44 is directed to input terminals of multiplex switch 46. It will be appreciated that five additional switches (18′) identical to switch 18 also have output lines connected to inputs of switch 46. Switch 46 has an address bus 48 which is also controlled by microprocessor 2. Output line 50 connects switch 46 to analog-to-digital converter 52 by way of an intermediate amplifying circuit 54.

Analog-to-digital converter 52 has outputs connected to microprocessor 2 by way of bus 56.

The multiplexing arrangement of the invention operates as follows. Microprocessor 2 generates addresses to instruct switches 18 (and 18′), 20 and 22 to sequentially connect a single input line, such as 32 or 36, to an output line 40, 42 or 44. At the same time, switch 46 is instructed to connect one of the lines 40, 42 or 44 to output line 50. The voltage on line 50 is converted to a digital word representative of that voltage by analog-to digital converter 52, and this digital word is supplied to the microprocessor by bus 56.

The input circuit for switches 18 will now be described. A signal light 58 is connected to a source of 60 Hz electrical power by a switch 60, which is part of a known traffic control system. The voltage across signal light 58 is applied as an input along line 62. Signal light 58 is preferably a red, yellow, green or walk signal, and other signal lights may, of course, be monitored. It is very important to measure the voltage across signal light 58 with high accuracy because of the standards set by NEMA regarding the voltage at which failures are to be detected. For example, a failure of a red signal may be defined as a voltage across lamp 58 of 60 volts RMS or less. The required sensitivity will be appreciated from the fact that a dimmer to reduce the energy consumption during nighttime hours may be used, and such a dimmer typically operates by rectifying the AC power applied to the signal light. An AC power signal of 95 volts RMS, when half-wave rectified, produces 67 volts RMS. Thus, the apparatus of the invention has been designed to be capable of accurately detecting the difference between 67 volts RMS and 60 volts RMS.

The voltage input on line 62 is directed to a voltage divider which includes resistors 64, 66, and 70 and capacitor 73. A voltage of substantially 10 volts is applied at line 68, and this voltage is connected to the connection between resistor 64 and 66 by another resistor 70. Diodes 72 and 74 are arranged to provide over-voltage protection.

Figure 2A:
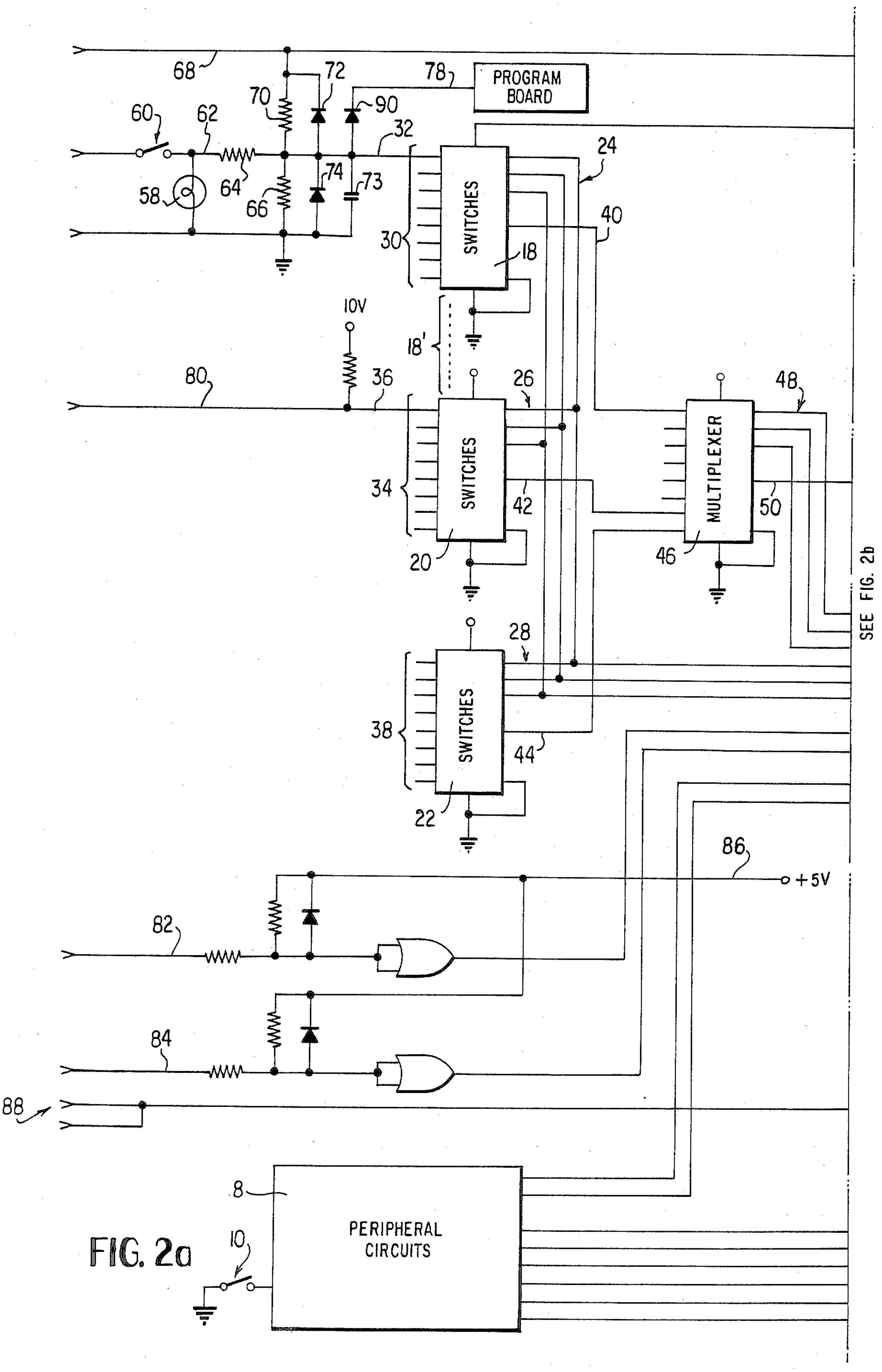
FIGS. 2*a* and 2*b* are a circuit diagram showing a preferred embodiment of an apparatus in accordance with the invention.
Figure 2B:
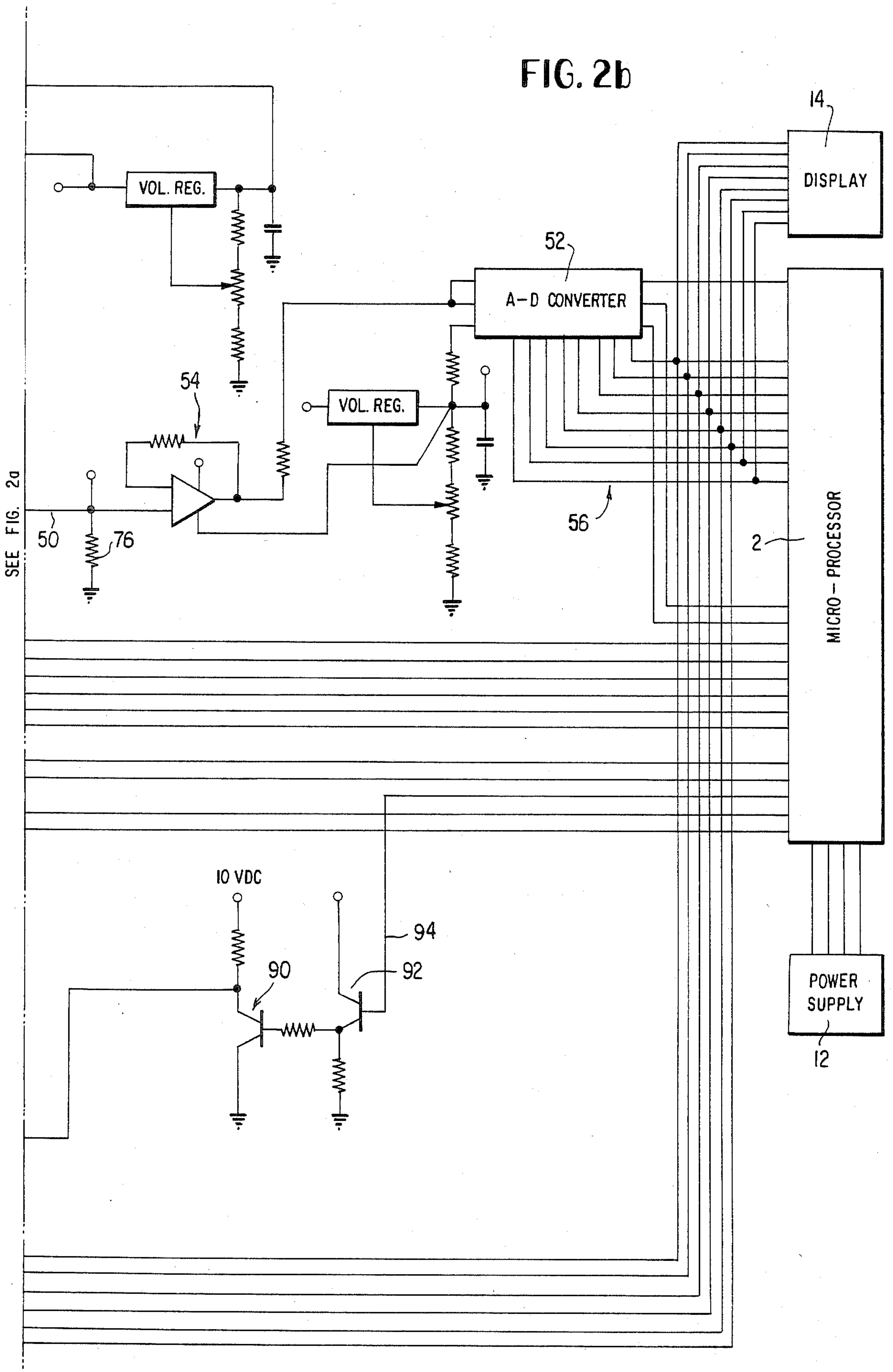

The input voltage connected to a switch 18 and switch 46 is further modified by input resistor 76 (see FIG. 2*b*). It will be appreciated that the net result of the action of resistors 64, 66, 70, and 76 and capacitor 73 and the application of voltage at line 68 is that the wave form applied to signal light 58 is made to have only positive voltages and be approximately 10 volts peak-to-peak. Preferably, the signal varies from just above zero volts to about 10 volts. Thus, the analog-to-digital converter receives only positive voltages whose maximum amplitude is limited.

The processor scans the inputs by causing switch 46 to connect an input line, such as 40, to output line 50 and to simultaneously cause switches 18 (and 18') to sequentially cause a respective input to be applied to output line 40. Then, switch 46 is instructed to allow another input line to be connected to output line 50, the other input line coming from a second switch, which is then caused to scan the series of inputs. When the apparatus is looking for conflicts, the series of inputs from switches 18 and 18' are continuously scanned thus providing a series of inputs to processor 2 by way of the analog-to-digital converter. The processor 2 is programmed to detect any of several pre-determined conflicts.

In order to provide an indication of the RMS voltage applied to the signal light 58, the processor is programmed to contain a look-up table wherein the input to the table is the voltage (in digital format) provided by A-D converter 52, and the output of the table is a representation of the square of the input voltage. Then, summation of these squares provides an indication of the RMS voltage applied to lamp 58.

Figures 3, 4:
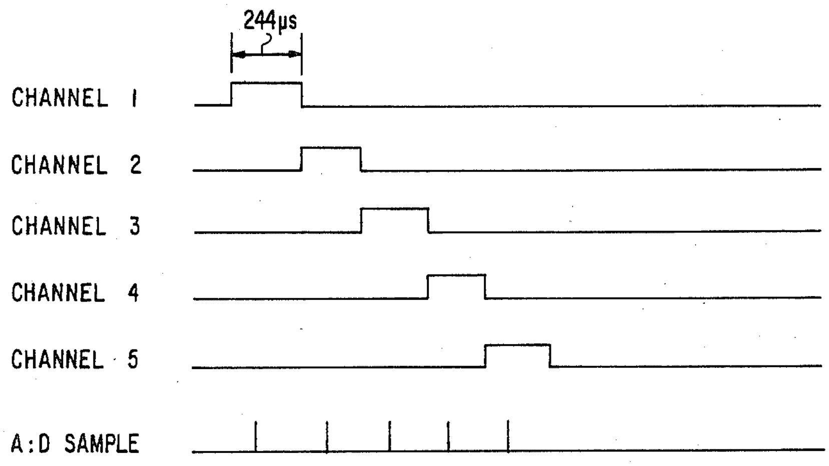
FIG. 3 is a graphical illustration of the sampling technique utilized in the circuit of FIG. 2.
FIG. 4 is a representation of a status table provided by the microprocessor shown in FIG. 2.

FIG. 3 illustrates how switches 18 provide the scanning of input signals. As an illustration, by scanning at a rate of 4,096 channels per second, each channel remains open for a period of 244 microseconds. Sampling periods for five channels are shown in FIG. 3. A-D sampling is illustrated by a line beneath channel 5. The converter 52 samples voltage during a period of approximately 15 microseconds which begins approximately 50 microseconds after a respective channel is opened to allow ringing to dissipate. Thus, the A-D converter acts like a digital sample-and-hold circuit.

The samples from the A-D converter are accepted by the microprocessor at a preferred frequency of 85.33 Hz. This is asynchronous with the 60 Hz input signal and avoids continuously sampling at an error point. In the preferred embodiment, 17 samples provide a highly accurate indication of the input voltage and provides a relative minimum error. Thus, 17 samples, each of which represents a square of an input voltage, are summed to provide an accurate indication of the RMS voltage of the input signal, and this voltage is utilized in the comparison program of the microprocessor. The various voltages thus developed are compared with each other in accordance with the prescribed conflict and/or timing program to determine whether relay 16 should be activated to place the intersection in a warning mode.

A general relationship between the sampling frequency, line frequency, and number of samples is as follows:

$$\frac{F_sN - F_lM}{N} \leqq 0.35$$

where $F_s$=sampling frequency $F_l$=line frequency

M=an integer representing the number of samples

N=an integer not equal to M

It will be appreciated that the above relationship produces sample sizes other than 17 for an acceptable error at a sample rate of 85.33 Hz and a line frequency of 60 Hz. Applicant has determined that a sample size of 17 produces acceptably low error and a short response time to permit fast detection of a conflict or other error. Of course other line and sampling rates could be developed in accordance with the above relationship.

It will be appreciated that microprocessor 2 receives virtually all the information necessary to permit measurement of a wide variety of parameters associated with the operation of signal lights 58. For example, the mere activation of a signal light will be known, the amplitude of the voltage applied to the signal light will be known with a high degree of accuracy, the duration of activation may be measured, and other such parameters will be apparent to those of skill in the art.

When a conflict or other error is detected a relay is activated to cause the signal lights to flash. The relay is a "watchdog" relay which remains closed only when the processor is producing a stream of pulses. When the processor 2 detects a fault, the production of these pulses is terminated, and the relay places the intersection signals in their warning mode. Also, if there is a breakdown in the processor itself, the stream of pulses will terminate, resulting in the activation of the relay to place the intersection in a warning mode.

The manner in which the program board is read will now be described. A program board as prescribed by NEMA comprises a generally flat printed wiring board having a number of connection terminals along one edge. Each of the terminals is indicative of a permissible conflict between channels. A plurality of holes in the board accept wire jumpers. For example, one hole may represent a red light on a given channel and a second hole may represent a red light on another channel. One of these holes is connected to a common pin, and the other is connected to one of the plurality of terminals along the edge of the program board. If a jumper is placed between these holes thus connecting the terminals, the terminal along the edge will be connected to the common pin. If the jumper is not present, the terminal will not be connected to the common pin.

In accordance with the invention, program board pins are connected through a plurality of inputs 78. It will be appreciated that the six switches 18 (and 18') provide 48 inputs, switches 20 and 22 provide an additional 16 inputs, for example, at input 80, and that buffered inputs are also provided at 82 and 84. Buffered inputs 82 and 84 will be at approximately 5 volts because line 86 is supplied by a 5-volt source. Input 68 is supplied with a 10-volt source which, by the action of a voltage divider comprised of resistors 64, 66 and 70 and the resistance of bulb 58 provides a five-volt DC signal on line 32. Common pins on the program board are connected at inputs 88, which are connected to the collector of transistor switch 90. Switch 90 is controlled by a buffer 92 which is in turn controlled by microprocessor 2. When microprocessor 2 wishes to read the program board for determining permissible conflicts to be used in the conflict determining mode, a signal is applied to the base 94 of switch 92, thus activating the switch 90. If a program board connection 78 is connected to common pin 88 (by a jumper on the program board), and switch 90 is activated, terminal 78 will be connected to ground. The voltage seen on line 32 by switch 18 will then be approximately 0.9 volts, which is the voltage drop across diode 96 and transistor 90. If the pin 78 is not connected to common pin 88 in the program board (by the absence of a jumper), line 32 will see a voltage of approximately 5 volts. In order to allow for the possibility that the signal on line 32 includes a voltage from activation of switch 60, microprocessor 2 is instructed to take a plurality of samples of the voltage on line 32 when reading the program board and to determine the average of the samples. If switch 60 is open, and pin 78 is not connected to common pin 88, line 32 will have substantially 5 volts DC thereon, and the average will be 5 volts. On the other hand, if the switch 60 is closed, line 32 will see an AC signal of approximately 0 to +10 volts, as described above, and the average will again be approximately 5 volts.

Switches 20, 22 and buffers 82 and 84 are utilized exclusively for reading program board inputs substantially as described above.

It will be appreciated that the input circuitry shown in FIG. *2a* allows for inputs from both the signal lights and program boards to be efficiently supplied to the microprocessor.

When in the conflict-determining mode, the microprocessor 2 analyzes the signals from scanned inputs 30 and is programmed to activate output relay 16 on determination of a conflict. Microprocessor 2 is capable of dealing with 8-bit words and, this word is divided into two sets of 4 bits, or 2 "nibbles". Each nibble contains digital information representative of whether a red, green, yellow or walk lights are activated. Microprocessor 2 first determines which conflicts are not permissible and addresses the nibbles containing those phases. Nibbles are then compared in various logical ways depending upon the particular features to be used in the conflict monitor.

In addition to activating the relay upon detection of a conflict, display 14 is used to provide a visual indication to a maintenance worker of the detected conflict. The display preferably comprises a plurality of light emitting diodes controlled by microprocessor 2. A first plurality of the diodes represents the number of channels being monitored, while a second represents the signal indications in each channel. For example, in a 12-channel apparatus, 12 LEDs will represent the channels, and 4 LEDs will represent, respectively, red, yellow, green and walk. Additional LEDs may represent whether the microprocessor 2 has detected a conflict, a channel failure, a short yellow light, a short green light, or a voltage failure. Microprocessor 2 is programmed such that when a designated conflict, or other error, is detected, selected LEDs in display 14 are illuminated to indicate the detected error. For example, if a conflict is detected involving the green light in channel 1 and the green light in channel 2, LEDs indicating this conflict will be illuminated.

In another aspect of the display, it is possible to sequentially step through each channel and determine the status of each phase in that channel at the time of the conflict. In order to accomplish this, microprocessor 2 is programmed to provide a status table, a conceptual illustration of which is shown in FIG. 4. For each channel, for example 1 through 12, microprocessor 2 determines whether the walk, green, yellow, or red light is activated and also determines whether the green or yellow lights are displayed for a period of time shorter than a predetermined period. Also, the microprocessor determines whether that channel is involved in a channel failure or a conflict. Such information as conceptually illustrated in FIG. 4 by the row adjacent channel 1. Similar information is recorded for each of the channels whereby a table is developed having all relevant information for each channel. This table is up-dated for each scan of the inputs 30. As noted above, these inputs are scanned at a rate of 4,096 Hz and thus the status table represents essentially current information.

When a conflict is detected, the addition of information into the status table terminates so that this information is retained for use by maintenance personnel. Maintenance switch 10 operates through peripheral circuitry 8 to communicate with microprocessor 2 to instruct microprocessor 2 to cause display 14 to read out the status table shown in FIG. 4. This may be accomplished, for example, by causing each of the channel LEDs to sequentially illuminate upon activation of the maintenance switch 10 and to illuminate additional LEDs to display the information shown in the channel 1 row of FIG. 4.

In a preferred embodiment, activation of maintenance switch 10 the first time causes a status display with respect to channel 1, and sequential activation of maintenance switch 10 causes the display 10 to sequentially display the status of channels 2 through 12 by illuminating a LED representative of channel 2 and additional LEDs representative of the information described with respect to channel 1 of FIG. 4.

It will be appreciated that the above-described apparatus and method indicate the channels involved in a conflict and furthermore specifies the kind of conflict. Additional assistance is provided to maintenance personnel by indicating the status of each channel at the time of a conflict. These two display modes provide unique assistance to maintenance personnel to greatly reduce the time required to repair traffic equipment which has failed.

In addition to the above-described inputs, peripheral circuitry 14 is adapted to receive an input from a dimmer, which has not been shown, but which may be that described in U.S. Pat. No. 4,368,408. When the peripheral circuitry receives such input, a signal is supplied to microprocessor 2, whereby program steps related to the dimmer are activated. For example, different threshold values may be used, or the thresholds for selected signal lights can be altered.

What is claimed is:

1. Apparatus for processing a first plurality of condition-indicating signals comprising a plurality of first scanning means, each of said first scanning means having input means for receiving a second plurality of said condition-indicating signals and producing a first output signal representative thereof said second plurality being less than said first plurality, a second scanning means receiving each output signal from said plurality of first scanning means as an input signal and producing a second output signal, and control means for producing address signals for causing said second scanning means to pass signals from a selected one of said plurality of first scanning means while also causing said selected one to pass said second plurality of condition-indicating signals sequentially to said second scanning means, wherein said condition-indicating signals represent voltages applied to traffic-control lights and said control means comprises processor means for determining whether selected ones of said condition-indicating signals are at a predetermined level and for producing a signal indicative thereof.

2. Apparatus according to claim 1 further comprising sample and hold means for receiving said second output signal and producing a representation of said second output signal.

3. Apparatus according to claim 2 wherein said sample and hold means is an analog-to-digital converter.

4. Apparatus according to claim 1 wherein said input means is connected to a program board means having an indication of permissible conflicts and said control means receives programming signals from said program board to identify said selected ones of said condition-indicating signals.

5. Apparatus according to claim 4 further comprising input circuit means comprising voltage-reducing means for receiving a line voltage across a traffic-control light and reducing said line voltage to a reduced voltage having a peak-to-peak value of less than or equal to ten volts, and means for supplying a bias voltage for biasing said reduced voltage so that the biased reduced voltage is always positive, to produce said condition-indicating signals.

6. Apparatus according to claim 5 further comprising grounding means for causing a pin means of said program board means to have a preselected voltage in response to a programming command signal.

7. Apparatus according to claim 6 wherein said grounding means comprises a semiconductor switch which is activated by said programming command signal, and wherein said control means produces said programming command signal, whereby when said semiconductor switch is activated said control means detects either said biased reduced voltage or said bias voltage.

8. Apparatus according to claim 7 wherein said first and second scanning means are semiconductor elements having address means connected to said control means.

9. A method for determining the voltage of an analog signal comprising the steps of supplying said signal to an input terminal of an element having an input terminal, an output terminal, and a control terminal, applying a control signal to said control terminal to cause said signal to be applied to said output terminal during a predetermined time period, said sampling said signal with voltage-determining means during an interval shorter than said time period, wherein said voltage-determining means includes an analog-to-digital converter, and further comprising the step of determining the voltage of said signal by supplying the digital word produced by said analog-to-digital converter to a processor means and using said digital word as an address in a stored table to select a stored value representative of the square of a voltage corresponding to said address, wherein said sampling is done at a frequency not equal to the frequency of said analog signal and wherein the step of determining the voltage comprises the step of summing a plurality of the selected stored values representative of the voltage, wherein said plurality is determined in accordance with the relationship:

$$\frac{F_s N - F_1 M}{N} \leq 0.35$$

where $F_s$=sampling frequency $F_1$=frequency of the analog signal

M=an integer equal to the number of said plurality of said values

N=an integer not equal to M.

10. A method according to claim 9 wherein said step of sampling causes said interval to begin after the beginning of said time period by a length of time sufficient to allow ringing caused by initiation of said time period to dissipate.

11. A method according to claim 10 wherein said element has a plurality of input terminals, and said step of supplying causes a respective input terminal to be supplied with a respective one of a plurality of analog signals to be measured, and wherein said step of applying a control signal causes a respective one of said input signals to be applied to said output terminal during a respective said time period, and wherein said voltage-determining means includes an analog-to-digital converter.

12. A method according to claim 9 wherein the frequency of said analog signal is substantially 60 Hz and the frequency of said sampling is substantially 85 Hz.

13. A method for determining the voltage of an analog signal comprising the steps of supplying said signal to an input terminal of an element having an input terminal, an output terminal, and a control terminal, applying a control signal to said control terminal to cause said signal to be applied to said output terminal during a predetermined time period, and sampling said signal with voltage-determining means during an interval shorter than said time period, wherein said voltage-determining means includes an analog-to-digital converter, and further comprising the step of determining the voltage of said signal by supplying the digital word produced by said analog-to-digital converter to a processor means and using said digital word as an address in a stored table to select a stored value representative of the square of a voltage corresponding to said address, wherein said sampling is done at a frequency not equal to the frequency of said analog signal, and wherein the step of determing the voltage comprises the step of summing a plurality of the selected stored values to determine a root-means-square voltage.

14. A method according to claim 13 wherein the frequency of said analog signal is substantially 60 Hz, the frequency of said sampling is substantially 85 Hz, and said plurality of said values representative of the voltage numbers is 17.

15. A method according to claim 13 further comprising the steps of determining whether said signal has been rectified and producing an output indicative thereof.

16. A method for programming a traffic conflict monitor to identify permissible conflicts between channels comprising the steps of providing a plurality of input terminals connected to corresponding terminals on a program-board said program board having means to connect selected said program board terminals to designate permissible conflicts, providing a ground terminal connected to a common terminal on said program board, connecting a ground means to establish said common terminal at a predetermined voltage, determining the voltages at said plurality of input terminals and supplying the voltages thus obtained to a processor means, said processor means using the determined voltages to determine which of said conflicts are not permissible when said processor is used in a conflict determining mode.

17. A method according to claim 16 wherein each of said plurality of input terminals is supplied with a predetermined voltage, and said step of determining includes the step of measuring each input voltage at a plurality of times to obtain sampled voltages and averaging the sampled voltages in the processor means.

18. A method according to claim 17 wherein each of said plurality of input terminals is connected to a channel in a traffic control system and further comprising the step of disconnecting said ground means to allow said common terminal to have a floating voltage after said processor means has determined said voltages at said plurality of input terminals.

* * * * *